(12) United States Patent
Yamashita et al.

(10) Patent No.: US 8,913,167 B2
(45) Date of Patent: Dec. 16, 2014

(54) IMAGE PICKUP APPARATUS AND METHOD OF DRIVING THE SAME

(71) Applicant: Canon Kabushiki Kaisha, Tokyo (JP)

(72) Inventors: Yuichiro Yamashita, Hsinchu (TW); Masahiro Kobayashi, Tokyo (JP); Takeshi Kojima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 13/766,186

(22) Filed: Feb. 13, 2013

(65) Prior Publication Data
US 2013/0215304 A1   Aug. 22, 2013

(30) Foreign Application Priority Data

Feb. 17, 2012   (JP) ................................ 2012-033365

(51) Int. Cl.
  *H04N 3/14*      (2006.01)
  *H01L 27/00*     (2006.01)
  *H01L 31/062*    (2012.01)
  *H04N 5/3745*    (2011.01)

(52) U.S. Cl.
  CPC ....... *H04N 5/37457* (2013.01); *H04N 5/37452* (2013.01)
  USPC ........... 348/301; 348/294; 348/300; 348/308; 250/208.1; 257/291

(58) Field of Classification Search
  None
  See application file for complete search history.

(56) References Cited

U.S. PATENT DOCUMENTS

| 7,323,731 | B2 | 1/2008 | Yuzurihara et al. |
| 2010/0053398 | A1* | 3/2010 | Yamashita ................. 348/302 |
| 2010/0328302 | A1 | 12/2010 | Yamashita et al. |
| 2011/0241089 | A1* | 10/2011 | Ohri et al. ..................... 257/291 |
| 2012/0153126 | A1* | 6/2012 | Oike et al. ................. 250/208.1 |
| 2012/0327278 | A1* | 12/2012 | Oike ............................. 348/294 |
| 2013/0214126 | A1* | 8/2013 | Kobayashi et al. ........ 250/208.1 |
| 2013/0214129 | A1* | 8/2013 | Kobayashi et al. ........ 250/208.1 |
| 2013/0215300 | A1* | 8/2013 | Kobayashi et al. ........... 348/294 |

(Continued)

FOREIGN PATENT DOCUMENTS

| JP | 2004-111590 A | 4/2004 |
| JP | 2008-004692 A | 1/2008 |

(Continued)

OTHER PUBLICATIONS

U.S. Appl. No. 13/766,001, filed Feb. 13, 2013, Masahiro Kobayashi.

*Primary Examiner* — Lin Ye
*Assistant Examiner* — John H Morehead, III
(74) *Attorney, Agent, or Firm* — Canon USA Inc IP Division

(57) ABSTRACT

An image pickup apparatus includes pixels each including a photoelectric conversion unit, an amplifying element, a first signal holding unit and a second signal holding unit both disposed in an electric path between the photoelectric conversion unit and an input node of the amplifying element, a first charge transfer unit configured to transfer electrons from the photoelectric conversion unit to the first signal holding unit, and a second charge transfer unit configured to transfer electrons from the first signal holding unit to the second signal holding unit. Voltage are set such that a voltage supplied to the first control electrode when the electrons are transferred from the photoelectric conversion unit to the first signal holding unit is lower than a voltage supplied to the second control electrode when the electrons held by the first signal holding unit are transferred to the second signal holding unit.

10 Claims, 9 Drawing Sheets

(56) References Cited

U.S. PATENT DOCUMENTS

2013/0215304 A1* 8/2013 Yamashita et al. ............ 348/301
2013/0215305 A1* 8/2013 Yamashita et al. ............ 348/301
2014/0084142 A1* 3/2014 Machida .................... 250/208.1

FOREIGN PATENT DOCUMENTS

| | | |
|---|---|---|
| JP | 2009-296674 A | 12/2009 |
| JP | 2011-082425 A | 4/2011 |
| JP | 2011-217315 A | 10/2011 |

* cited by examiner

IMAGE PICKUP APPARATUS AND METHOD OF DRIVING THE SAME

BACKGROUND OF THE INVENTION

1. Field of the Invention

The present invention relates to an image pickup apparatus, and more particularly, to an image pickup apparatus configured such that a pixel includes a signal holding unit.

2. Description of the Related Art

It is known to configure an image pickup apparatus such that each pixel has an amplifying element, as is known as an in-pixel amplification type. In the image pickup apparatus of the in-pixel amplification type, each pixel is capable of holding a signal in a photoelectric conversion unit and at an input node of an amplifying element. For use in such an image pickup apparatus of an in-pixel amplification type, a global electronic shutter technique has been developed which allows it to obtain an equal exposure period over an entire image sensing plane. A plurality of configurations are known to achieve a global electronic shutter. In one configuration, a signal holding unit is disposed, separately from a photoelectric conversion unit and an amplifying element, in an electric path between the photoelectric conversion unit and an input node of the amplifying element. It is also known to dispose a plurality of signal holding units between a photoelectric conversion unit and an input node of an amplifying element (see, for example, Japanese Patent Laid-Open No. 2009-296674 and Japanese Patent Laid-Open No. 2011-217315). However, in the configuration in which a plurality of signal holding units are disposed in an electric path between an output node of a photoelectric conversion unit and an input node of an amplifying element, no much consideration has been given to the efficiency of transferring a signal charge. In an image pickup apparatus including a first signal holding unit and a second signal holding unit disposed such that the first signal holding unit is located close to a photoelectric conversion unit and the second signal holding unit is located between the first signal holding unit and an amplifying element, a signal charge generated in the photoelectric conversion unit reaches the input node of the amplifying element after travelling through the first signal holding unit and the second signal holding unit. When the signal charge travels through an electric path, if a proper potential is not formed in the electric path, part or all of the signal charge may stop somewhere in the electric path, which may result in a problem.

SUMMARY OF THE INVENTION

In view of the above, embodiments of the invention provide an improved efficiency of transferring a signal charge in a configuration in which a plurality of signal holding units are disposed in an electric path between an output node of a photoelectric conversion unit and an input node of an amplifying element.

According to an aspect, an image pickup apparatus includes a plurality of pixels each including a photoelectric conversion unit, an amplifying element configured to amplify a signal based on electrons generated in the photoelectric conversion unit, a first signal holding unit and a second signal holding unit located at a stage following the first signal holding unit, both being disposed in an electric path between the photoelectric conversion unit and an input node of the amplifying element, a first charge transfer unit configured to transfer electrons from the photoelectric conversion unit to the first signal holding unit, and a second charge transfer unit configured to transfer electrons held by the first signal holding unit to the second signal holding unit, the first charge transfer unit including a first semiconductor region and a first control electrode disposed above the first semiconductor region via an insulating film, the second charge transfer unit including a second semiconductor region and a second control electrode disposed above the second semiconductor region via an insulating film, the first control electrode and the second control electrode being supplied with voltages such that a voltage supplied to the first control electrode when the electrons are transferred from the photoelectric conversion unit to the first signal holding unit is lower than a voltage supplied to the second control electrode when the electrons held by the first signal holding unit are transferred to the second signal holding unit.

Further features of the present invention will become apparent from the following description of exemplary embodiments with reference to the attached drawings.

DESCRIPTION OF THE EMBODIMENTS

Embodiments of the invention relate to an image pickup apparatus of an in-pixel application type in which each pixel includes an amplifying element. More specifically, the image pickup apparatus includes a plurality of signal holding units disposed in an electric path between an output node of a photoelectric conversion unit and an input node of an amplifying element in a pixel. The plurality of signal holding units includes a first signal holding unit and a second signal holding unit located at a stage following the first signal holding unit.

In this configuration, a voltage supplied to the first signal holding unit when electrons are transferred from the photoelectric conversion unit to the first signal holding unit is set to be lower than a voltage supplied to the second signal holding unit when electrons held by the first signal holding unit are transferred to second signal holding unit.

By setting the voltages in the configuration as described above, it is possible to minimize a number of electrons returning to the photoelectric conversion unit from somewhere between the photoelectric conversion unit and the first signal holding unit. This results in an increase in efficiency of transferring a charge from the photoelectric conversion unit to the second signal holding unit.

Figure 1:
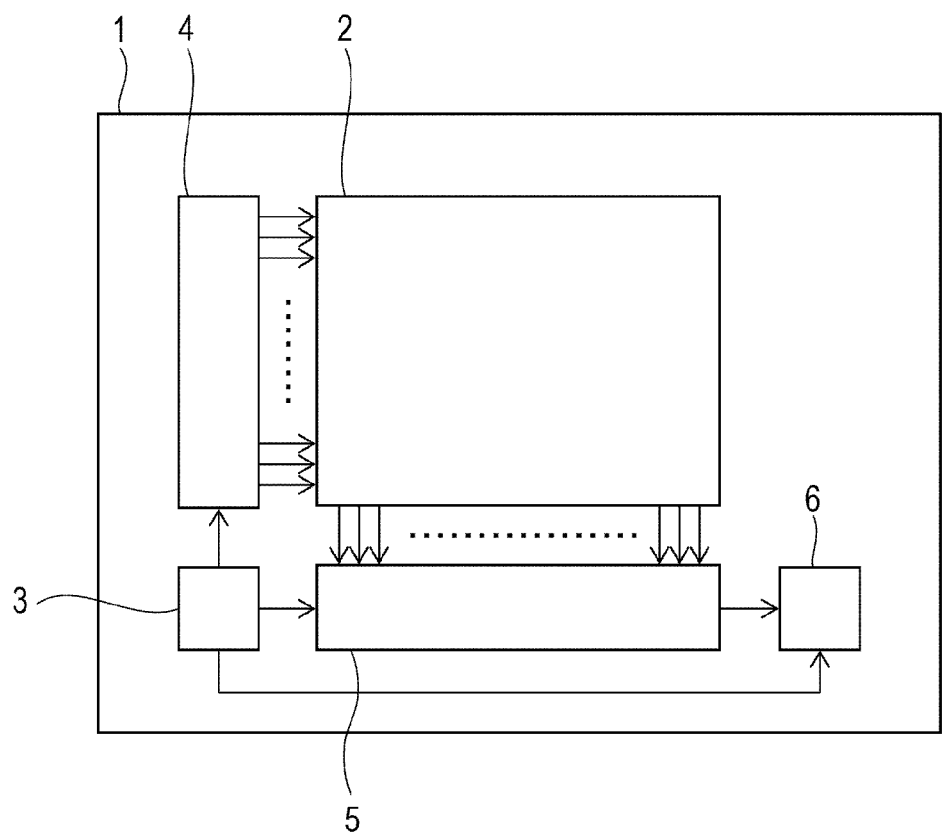
FIG. 1 is a block diagram illustrating a whole structure of an image pickup apparatus.

FIG. 1 is a block diagram illustrating a whole structure of an image pickup apparatus according to an embodiment of the invention. The image pickup apparatus 1 may be constructed on a single chip using a semiconductor substrate. The image pickup apparatus 1 includes an image sensing area 2 in which a plurality of pixels are disposed. The image pickup apparatus 1 further includes a control unit 3. The control unit 3 supplies a control signal, a power supply voltage, and the like to a vertical scanning unit 4, a signal processing unit 5, and an output unit 6.

The vertical scanning unit 4 supplies a driving pulse to the plurality of pixels disposed in the image sensing area 2. The vertical scanning unit 4 may supply a driving pulse to pixels on a row-by-row basis or in units of a plurality of rows of pixels. The vertical scanning unit 4 may be formed using a shift register or an address decoder.

The signal processing unit 5 includes a column circuit, a horizontal scanning circuit, and a horizontal output line. The column circuit includes a plurality of circuit blocks respectively configured to receive signals of pixels included in a pixel row selected by the vertical scanning unit 4. Each circuit block may include all or one or more of following elements: a signal holding unit; an amplifier; a noise rejection circuit; and an analog-to-digital converter. The horizontal scanning circuit may be formed using a shift register or an address decoder.

The output unit 6 outputs a signal received via the horizontal output line to the outside of the image pickup apparatus 1. The output unit 6 includes a buffer or an amplifier.

Figure 2:
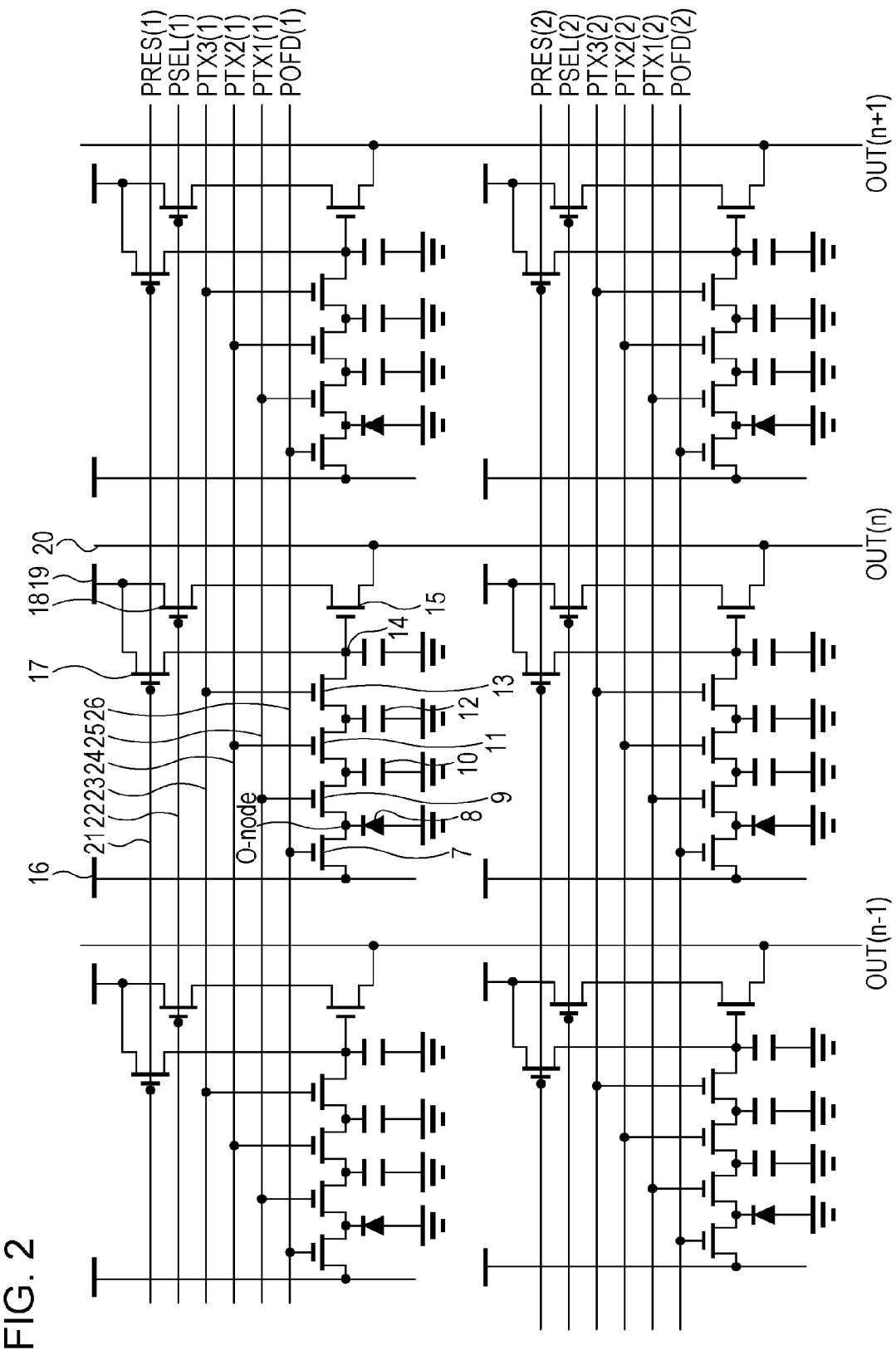
FIG. 2 is an equivalent circuit diagram of an image sensing area of an image pickup apparatus.

FIG. 2 illustrates an equivalent circuit diagram of the image sensing area of the image pickup apparatus according to the embodiment. Although FIG. 2 illustrates only 6 pixels arranged in an array including 2 rows and 3 columns, the image sensing area may include a greater number of pixels.

A photoelectric conversion unit 8 converts incident light into electron-hole pairs. O-node denotes an output node of the photoelectric conversion unit 8. In FIG. 2, a photodiode is used by way of example as the photoelectric conversion unit 8.

A first charge transfer unit 9 transfers holes or electrons generated in the photoelectric conversion unit 8 to a circuit element at a following stage. In the following discussion, it is assumed by way of example that a signal charge is provided by electrons. The first charge transfer unit 9 includes a first control electrode disposed on a semiconductor substrate via an insulating film.

A first signal holding unit 10 holds the electrons transferred by the first charge transfer unit 9. A second charge transfer unit 11 transfers the electrons held by the first signal holding unit 10 to a circuit element at a following stage. The second charge transfer unit 11 includes a second control electrode disposed on the semiconductor substrate via an insulating film.

The second signal holding unit 12 holds the electrons transferred from the first signal holding unit 10 via the second charge transfer unit 11.

A third charge transfer unit 13 transfers the electrons held by the second signal holding unit 12 to a circuit element at a following stage. The third charge transfer unit 13 includes a third control electrode disposed on the semiconductor substrate via an insulating film.

An input node 14 of an amplifying element 15 is capable of holding the electrons transferred from the second signal holding unit 12 via the third charge transfer unit 13. The input node 14 of the amplifying element 15 may include a floating diffusion (FD) region disposed on the semiconductor substrate. The amplifying element 15 amplifies a signal based on the electrons transferred to the input node 14 and outputs a resultant amplified signal to a vertical signal line 20. In this example, a transistor (hereinafter referred to as an amplifying transistor) is used as the amplifying element 15. For example, the amplifying transistor may operate as a source follower.

A fourth charge transfer unit 7 transfers electrons from the photoelectric conversion unit 8 to an overflow drain (OFD) region. The OFD region may be formed using an N-type semiconductor region electrically connected to a voltage supply line 16 configured to supply, for example, a power supply voltage. The fourth charge transfer unit 7 includes a fourth control electrode formed on the semiconductor substrate via an insulating film.

A reset unit 17 supplies a reference voltage to the input node 14 of the amplifying element 15 thereby resetting electrons held at the input node 14 of the amplifying element 15. In the present example, a transistor (hereinafter referred to as a reset transistor) is used as the reset unit 17.

A selection unit 18 selects a pixel and reads out a signal from the pixel on a pixel-by-pixel basis or a row-by-row basis to a vertical signal line 20. In the present example, a transistor (hereinafter referred as a selection transistor) is used as the selection unit 18.

A drain of the reset transistor 17 and a drain of the selection transistor 18 are supplied with a particular voltage via a power voltage supply line 19.

A reset control line 21 supplies a control pulse to a gate of the reset transistor 17. A selection control line 22 supplies a control pulse to a gate of the selection transistor 18. A third transfer control line 23 supplies a control pulse to the third control electrode. A second transfer control line 24 supplies a control pulse to the second control electrode. A first transfer control line 25 supplies a control pulse to the first control electrode. A fourth transfer control line 26 supplies a control pulse to the fourth control electrode of the fourth charge transfer unit 7. By controlling pulse values supplied to the respective control electrodes, it is possible to change a height of a potential barrier of a semiconductor region below each control electrode. According to an embodiment of the invention, supply voltages are set as follows. Let V1 denote a voltage supplied to the first control electrode when electrons are transferred from the photoelectric conversion unit to the first signal holding unit, and let V2 denote a voltage supplied to the second control electrode when the electrons held by the first signal holding unit to the second signal holding unit, then the voltage V1 is lower than the voltage V2. By setting the voltages V1 and V2 as described above, it becomes possible to increase the efficiency of transferring a charge from the first signal holding unit to the second signal holding unit and reduce a number of electrons returning from a region in the vicinity of the first charge transfer unit to the photoelectric conversion unit. As a result, it becomes possible to increase the efficiency of transferring a charge from the photoelectric conversion unit to the second signal holding unit.

In an embodiment of the invention, a high efficiency is achieved in particular when in the image pickup apparatus having the image sensing area configured as illustrated in the equivalent circuit shown in FIG. 2, an electric path between the photoelectric conversion unit 8 and the first signal holding unit 10 is formed in a manner described below. That is, the electric path is configured such that electrons are allowed to move from the photoelectric conversion unit 8 to the first signal holding unit 10 when the first charge transfer unit 9 disposed in the electric path between the photoelectric conversion unit 8 and the first signal holding unit 10 is in an off-state. Here the off-state refers to a state in which a pulse value is supplied to the first charge transfer unit 9 such that a potential barrier with a greater height is formed than formed by any other pulse value supplied to the first charge transfer unit 9. Therefore, the off-state does not necessarily mean a perfect off-state, but the off-state may be a state in which a potential barrier is higher than that formed in a perfect on-state.

More specifically, when the first charge transfer unit 10 is realized by a MOS transistor, an embedded channel structure may be employed for the MOS transistor to achieve the above-described potential. More generally, the above-described potential state may be achieved by providing a part located a particular distance lower than a surface such that the part has a potential barrier lower than the potential barrier at the surface when the first charge transfer unit 10 is in the off-state. In this case, the control pulse supplied to the first charge transfer unit 10 may be set to have a fixed value. That is, the first charge transfer unit 10 may have a fixed potential barrier which is not switched between the on-state and the off-state. In this configuration, when electrons are generated via a photoelectric conversion in response to light incident on the photoelectric conversion unit 8, almost all generated electrons move to the first signal holding unit 10 during an exposure period, which makes it possible to achieve the same accumulation time for all pixels over the entire image sensing plane.

Furthermore, the off-state of the first charge transfer unit 10 causes holes to be accumulated at a surface. Because there is a channel at a particular depth under the surface such that electrons are allowed to move through the channel, an effect of a dark current is reduced compared with a structure in which electrons move along an interface of an insulating film.

The embodiment of the invention may provide a high effect in particular when the embodiment is applied to the image pickup apparatus configured in the above-described manner. The invention is described in further detail below with reference to specific embodiments. In the following description, it is assumed by way of example that a signal charge is provided by electrons. Note that a signal charge may be provided by holes. In this case, an opposite conductivity type is used for each semiconductor region, and the relative magnitudes of voltages are reversed.

First Embodiment

Figure 3:
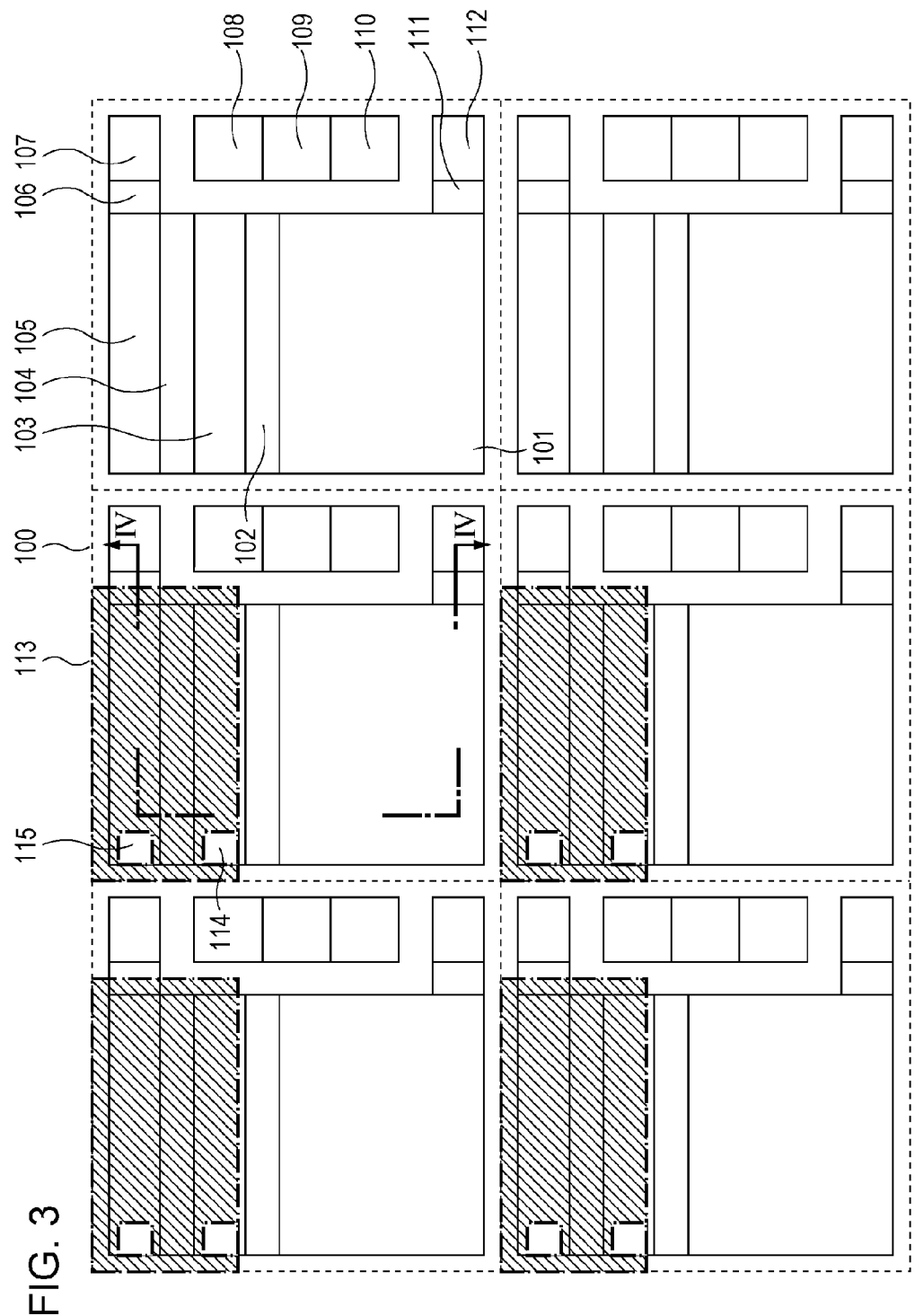
FIG. 3 is a top view of an image pickup apparatus according to a first embodiment.
Figure 4:
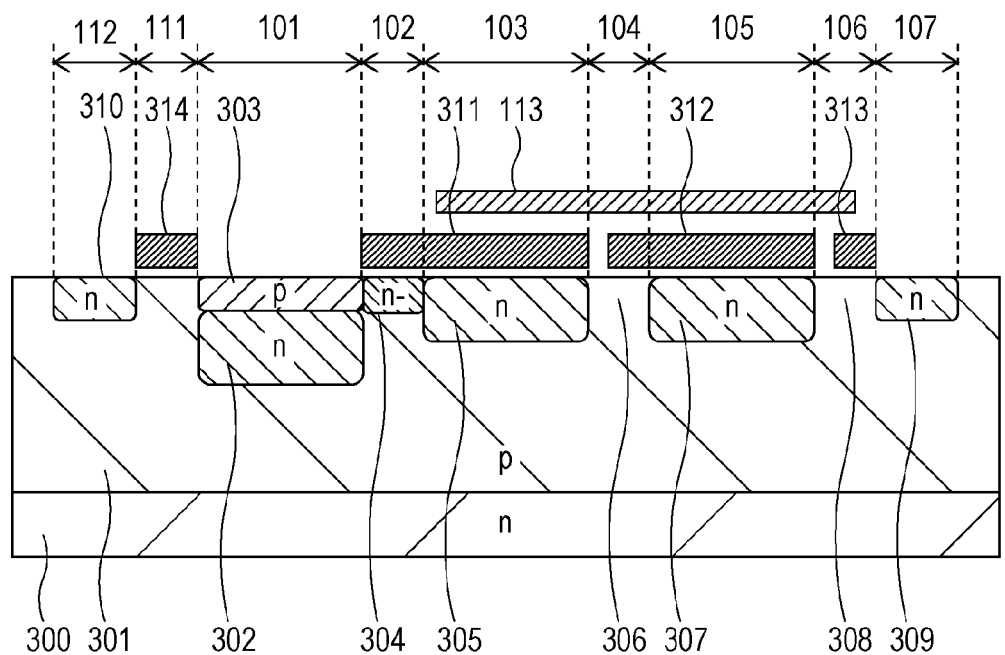
FIG. 4 is a cross-sectional view of a pixel of the image pickup apparatus according to the first embodiment.
Figure 5:
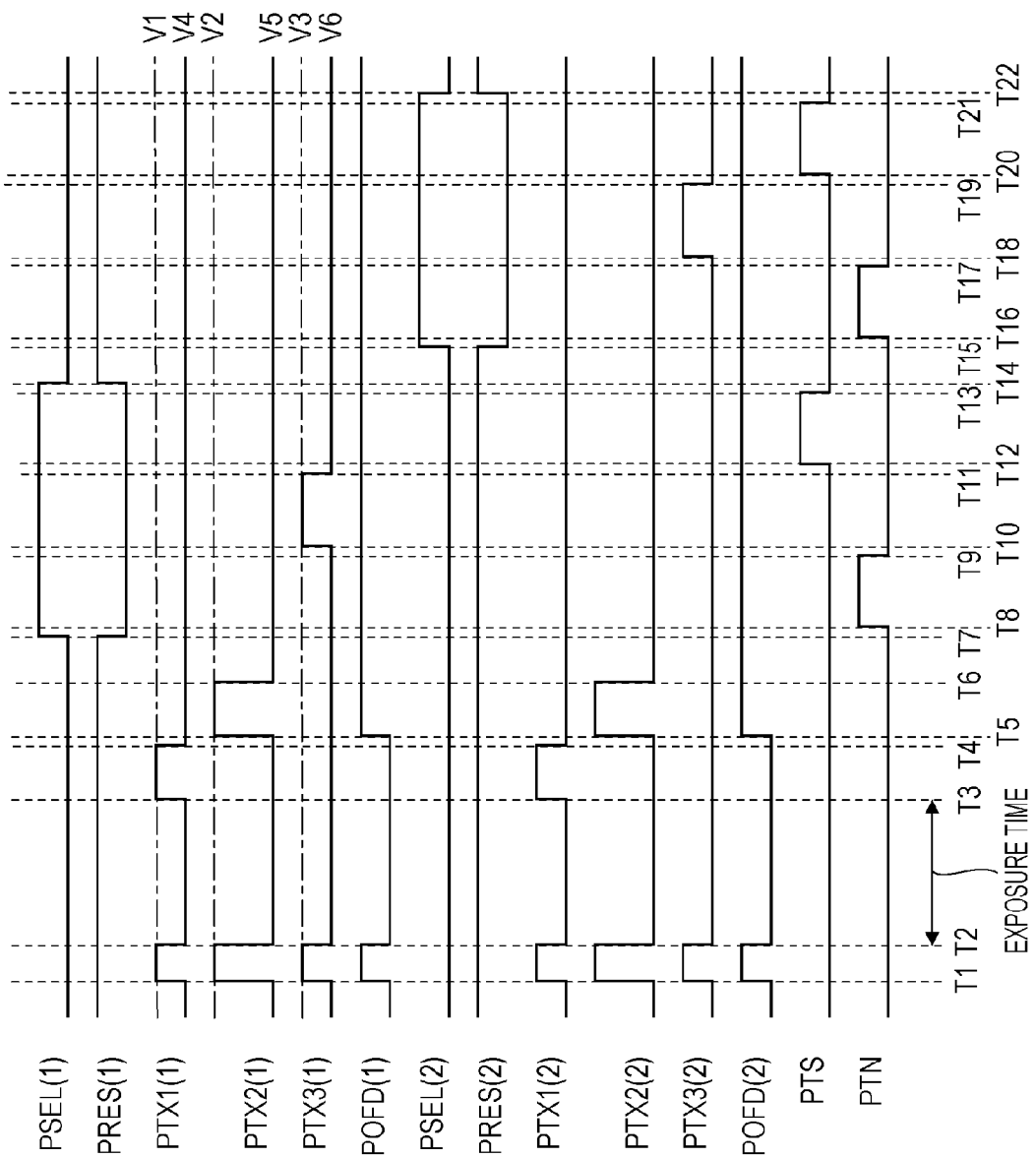
FIG. 5 is a diagram illustrating sequences of pulses for driving the image pickup apparatus according to the first embodiment.

Referring to FIGS. 3 to 5, a first embodiment of an image pickup apparatus is described below.

FIG. 3 is a top view of the image pickup apparatus according to the first embodiment. Although FIG. 3 illustrates only 6 pixels arranged in an array including 2 rows and 3 columns, the image sensing area may include a greater number of pixels.

A pixel 100 includes a photoelectric conversion unit 101, a first charge transfer unit 102, a first signal holding unit 103, and a second charge transfer unit 104. The pixel 100 further includes a second signal holding unit 105, a third charge transfer unit 106, an FD region 107, a reset transistor 108, an amplifying transistor 109, and a selection transistor 110. Furthermore, the pixel 100 also includes a fourth charge transfer unit 111, and an OFD region 112.

Elements having similar functions to those illustrated in FIG. 2 are denoted by similar reference numerals and a further detailed description thereof is omitted. The FD region 107 includes an N-type semiconductor region to which electrons held by the second signal holding unit 105 are transferred.

Each area hatched with diagonal lines represents a light shielding member 113 which covers the whole second signal holding unit 105 and part of the first signal holding unit 103. More strictly, the second signal holding unit 105 includes an area where a plug is disposed as described below, and this area is not covered with the light shielding member 113, and thus a strict covering ratio of the light shielding member is 95% or greater. In FIG. 3, for an easier understanding of relative positions and sizes of elements of a pixel, a light shielding member is not shown in a rightmost column.

The light shielding member 113 extends continuously from a location above the first signal holding unit 103 to a location above the second signal holding unit 105 so as to cover an area between the first signal holding unit 103 and the second signal holding unit 105. More specifically, the light shielding member 113 may be disposed such that light coming toward the second signal holding unit 105 is completely shielded and light coming toward the first signal holding unit 103 is shielded at least partially. In other words, part of light may be incident on the first signal holding unit 103 during an exposure period.

A first opening 114 is formed so as to provide a place where an electrically conductive material is disposed therethrough to provide a control pulse to a control electrode of the first signal holding unit 101. Similarly, a second opening 115 is formed so as to provide a place where an electrically conductive material is disposed therethrough to provide a control pulse to a control electrode of the second signal holding unit 105.

The light shielding member 113 may be formed using the same metal as that used to form a wiring layer. Alternatively, the light shielding member 113 may be formed using the same metal as that used to form a plug for electrically connecting between different wiring layers or between a wiring and a semiconductor region. The light shielding member 113 may be disposed so as to be as close to the semiconductor substrate as possible. This may be achieved by using the same metal as that used to form a wiring layer closest to the semiconductor substrate or the same metal as that used to form a plug for electrically connecting between a lowest-level wiring layer and a semiconductor region. Alternatively, a metal dedicated to the light shielding member 113 may be disposed between the lowest-level wiring layer and the semiconductor substrate. Although only light shielding members for the signal holding units are shown in FIG. 3, a light shielding member may be disposed also above transistors included in a pixel circuit. Alternatively, a wiring may be used to shield transistors in a pixel circuit against light.

In FIG. 3, the light shielding member 113 has a shape extending in plan view such that the whole second signal holding unit 105 is located inside an outer edge of the light shielding member 113, and part of the first signal holding unit 103 is located inside the outer edge of the light shielding member 113 and the remaining is located outside the outer edge. Note that the shape of the light shielding member 113 is not limited to that described above, and many shapes may be employed as long as the light shielding member 113 may reduce an amount of light incident on the first signal holding unit and the second signal holding unit.

FIG. 4 is a cross-sectional view taken along line IV-IV of FIG. 3. In FIG. 4, elements having similar functions to those in FIG. 3 are denoted by similar reference numerals, and a further description thereof is omitted.

A P-type semiconductor region 301 is disposed in an N-type semiconductor substrate 300. An N-type semiconductor region 302 is disposed such that a PN junction is formed between the N-type semiconductor region 302 and the P-type semiconductor region 301. A P-type semiconductor region 303 is disposed on the N-type semiconductor region 302 such that the P-type semiconductor region 303 is in contact with a surface side of the N-type semiconductor region 302. The P-type semiconductor region 301, the N-type semiconductor region 302, and the P-type semiconductor region 303 form a photodiode of a so-called embedded type.

Electrons generated in the photoelectric conversion unit 101 travel through a first channel 304 and then further travels to an N-type semiconductor region 305 (first semiconductor region) forming the first signal holding unit 103. The first channel 304 includes a low-concentration N-type semiconductor region which adjusts a potential barrier formed in the first charge transfer unit as will be described in further detail later. The electrons held in the N-type semiconductor region 305 then travel through a second channel 306 and then further travel to an N-type semiconductor region 307 (third semiconductor region) forming the second signal holding unit 105. The second channel 306 is formed by part of the P-type semiconductor region 301. An ion implantation may be performed to adjust a height of a potential barrier. Note that the potentials are controlled such that over a period in which a charge is held in the first signal holding unit, the height of the potential formed in the first channel 304 is greater than the height of the potential formed in the second channel 306. The electrons held in the N-type semiconductor region 307 then travel through a third channel 308 and then further travel to an N-type semiconductor region 309 forming an FD region. Under the control of a fourth control electrode 314, electrons are allowed to move from the photoelectric conversion unit 101 into an N-type semiconductor region 310 forming an OFD region.

A first control electrode 311 is formed above the first channel 304 and the N-type semiconductor region 305 via an insulator. The first control electrode 311 is shared by the first charge transfer unit 102 and the first signal holding unit 103. Alternatively, separate control electrodes may be disposed respectively for the first charge transfer unit 102 and the first signal holding unit 103 such that bias voltages may be supplied separately to the first charge transfer unit 102 and the first signal holding unit 103.

The first charge transfer unit 102 includes the first channel 304 and part of the first control electrode 311 disposed above the first channel 304 via an insulating film.

The first signal holding unit 103 includes the N-type semiconductor region (first semiconductor region) 305 and the P-type semiconductor region 301 which forms a PN junction between the P-type semiconductor region 301 and the N-type semiconductor region 305. The first signal holding unit 103 further includes part of the first control electrode 311 disposed above the N-type semiconductor region 305 via an insulating film.

A second control electrode 312 is disposed above the second channel 306 and the N-type semiconductor region 307 via an insulator. The second control electrode 312 is shared by the second charge transfer unit 104 and the second signal holding unit 105. Alternatively, separate control electrodes may be disposed respectively for the second charge transfer unit 104 and the second signal holding unit 105 such that bias voltages may be supplied separately to the second charge transfer unit 104 and the second signal holding unit 105.

The second charge transfer unit 104 includes the second channel 306 and part of the second control electrode 312 disposed above the second channel 306 via an insulating film.

The second signal holding unit 105 includes the N-type semiconductor region 307 and the P-type semiconductor region 301 which forms a PN junction between the P-type semiconductor region 301 and the N-type semiconductor region 307. The second signal holding unit 105 further includes part of the second control electrode 312 disposed above the N-type semiconductor region 307 via an insulating film.

A third control electrode 313 is disposed above the third channel 308 via an insulating film.

The third charge transfer unit 106 includes the third channel 308 and the third control electrode 313.

The light shielding member 113 continuously extends starting from a location which is above the first signal holding unit 103 and which is a particular distance apart from an end of the photoelectric conversion unit 101 such that the second charge transfer unit 104 and the second signal holding unit 105 are covered, and the light shielding member 113 further extends above the third charge transfer unit 106 until the light shielding member 113 reaches a location which is a particular distance apart from an end of the FD region. In the example illustrated in FIG. 4, in an area on the side of the photoelectric conversion unit, part of the first signal holding unit 103 is not covered by the light shielding member 113.

Note that the structure is not limited to that described above. For example, in the case where the control electrode 311 is shared by the first charge transfer unit 102 and the first signal holding unit 103 as in the example illustrated in FIG. 4, the control electrode 311 may have an uncovered part at least in an end area on the side of the photoelectric conversion unit.

The structure described above leads to a reduction in an effect of the light shielding member 113 on the photoelectric conversion unit, which results in an increase in sensitivity of the photoelectric conversion unit 101. Furthermore, it also becomes possible to reduce an effect of light incident at an angle with respect to a vertical direction on a pixel position.

The above-described structure may also allow electrons to be accumulated such that when electrons are generated via a photoelectric conversion in the N-type semiconductor region 305 or the P-type semiconductor region 301 forming the first signal holding unit 103, the generated electrons may be accumulated in the N-type semiconductor region 305. This allows pixels to have a further improved sensitivity.

FIG. 5 illustrates driving pulses for driving the image pickup apparatus according to the present embodiment. More specifically, FIG. 5 illustrates driving pulses which are used to perform a global electronic shutter operation such that an equal exposure period is achieved over the whole image sensing plane. Note that numerals in parentheses represent row numbers. In the example in FIG. 5, driving pulses illustrated are supplied to pixels in first and second rows. A driving pulse PSEL is supplied to a gate of a selection transistor. A driving pulse PRES is supplied to a gate of a reset transistor. A control pulse PTX1 is supplied to the first control electrode. A control pulse PTX2 is supplied to the second control electrode. A control pulse PTX3 is supplied to the third control electrode. A control pulse OFD 1 is supplied to the fourth control electrode. A control pulse PTS is for controlling an operation of sampling and holding an optical signal by a signal holding unit in a column circuit or the like. A control pulse PTN is for controlling an operation of sampling and holding a noise signal by a signal holding unit in a column circuit or the like. Note that in any pulse, a high level provides an on-state.

Before time t1, the PRES pulse is at a high level for all rows of an image sensing plane, and all other pulses are at a low level.

At time t1, PTX1, PTX2, PTX3, and POFD change from the low level to the high level for all rows of the image sensing plane while PRES is maintained at the high level. As a result, the photoelectric conversion unit 101, the first signal holding unit 103, and the second signal holding unit 105 are reset.

At time t2, PTX1, PTX2, PTX3, and POFD change from the high level to the low level for all rows of the image sensing plane. In response, an exposure period starts in all pixels of the image sensing plane. Thus electrons are generated in the photoelectric conversion unit 101 in the exposure period, and a particular number of electrons thereof move to the first signal holding unit 103.

After a particular period of time has elapsed, at time t3, PTX1 changes from the low level to the high level for all rows of the image sensing plane. At time t4, PTX1 changes from the high level to the low level for all rows of the image sensing plane. In FIG. 5, the high level of PTX1 is denoted by V1. V1 may be equal to, for example, 3 V.

In response to the above operation, electrons remaining in the photoelectric conversion unit 101 are transferred to the first signal holding unit 103, and the exposure period is ended.

At time t5, PTX2 and POFD change from the low level to the high level for all rows of the image sensing plane. In FIG. 5, the high level of PTX2 is denoted by V2. Note that V1 and V2 are set such that V1 is lower than V2.

At time t6, PTX2 and POFD change from the high level to the low level for all rows of the image sensing plane. In response to this operation, electrons held in the first signal holding unit 103 are transferred to the second signal holding unit 105. As a result of the turning-on of POFD, the height of the potential barrier between the photoelectric conversion unit 101 and the OFD region 112 becomes lower than the height of the potential barrier between the photoelectric conversion unit 101 and the first signal holding unit 103. Thus, electrons generated in the photoelectric conversion unit 101 do not move to the first charge storage unit 103 but move to the OFD region 112.

At time t7, PSEL(1) changes from the low level to the high level. As a result, it becomes possible for signals of pixels in the first row to be output to a vertical signal line. At the same time, PRES(1) changes from the high level to the low level, which causes the reset operation on the input node 107 of the amplifying element to be ended.

At time t8, PTN changes from the low level to the high level. At time t9, PTN change from the high level to the low level. In response, a noise signal is held by a noise signal holding unit disposed in the column circuit or the like.

At time t10, PTX3(1) changes from the low level to the high level. In FIG. 5, the high level of PTX3(1) is denoted by V3. It may be advantageous to set V3 such that V1<V3, although V3 may be set to an arbitrary value.

At time t11, PTX3(1) changes from the high level to the low level. In response, electrons held in the second signal holding unit 105 of each pixel in the first row are transferred to the input node 107 of the amplifying element.

At time t12, PTS changes from the low level to the high level. At time t13, PTS change from the high level to the low level. In response, an optical signal with a noise signal superimposed on the optical signal is held in the optical signal holding unit disposed in the column circuit or the like.

At time t14, PSEL(1) change from the high level to the low level. This operation causes the readout period for pixels in the first row to be ended. Thus, the readout period for the pixels in the first row is from t7 to t14. At this point of time t14, PRES(1) also changes from the low level to the high level.

Thereafter, in a period from t15 to t22, signals are read out from pixels in the second row. The operation is similar to that for the first row, and thus a further description thereof is omitted.

By performing the operation in the above-described manner, it becomes possible to provide an equal exposure period over the entire image sensing plane. Note that until time t6 at which the signal is transferred to the second signal holding unit 105, the operation is performed equally and simultaneously over the entire image sensing plane. By repeating this operation, reading is performed on a row-by-row basis for all rows of the image sensing plane.

FIGS. 6A to 6I illustrates relative heights of potential barriers at various times and in various periods of driving pulses illustrated in FIG. 5.

Figure 6A:
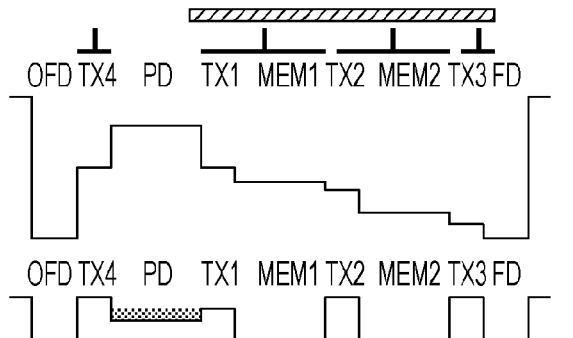
FIGS. 6A to 6I are diagrams illustrating potential distributions in a pixel of the image pickup apparatus according to the first embodiment.

FIG. 6A illustrates a potential state in the period from t1 to t2. In the period from t1 to t2, as described above with reference to FIG. 5, the high-level pulse is supplied to all of the first charge transfer unit TX1, the second charge transfer unit TX2, the third charge transfer unit TX3, and the fourth charge transfer unit TX4. Thus, all charge transfer units are in a state in which the potential barrier is low. In this state, electrons generated in the photoelectric conversion unit PD are ejected to the OFD region 112 or a drain (not illustrated in the figures) of a reset transistor, and thus there is no electron in the photoelectric conversion unit PD, the first signal holding unit MEM1, and the second signal holding unit MEM2.

In this state, it may be advantageous that the photoelectric conversion unit PD has a highest potential to electrons. Furthermore, as illustrated in FIG. 6A, it may be advantageous that the potential decreases from the photoelectric conversion unit PD to the input node FD of the amplifying element. As described above, when the high level voltages V1 and V2 respectively supplied to the first charge transfer unit and the second charge transfer unit are set such that V1<V2 as described above, it is easy to achieve the potential such as that illustrated in FIG. 6A.

Figure 6B:
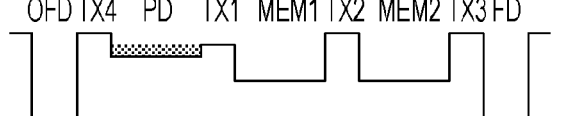
Figure 6C:
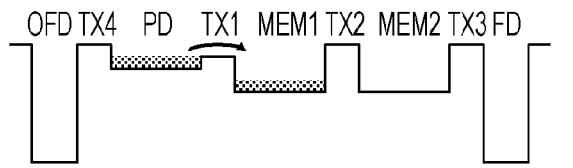

FIGS. 6B and 6C illustrate potential states in a period from t2 to t3, i.e., in an exposure period.

The first charge transfer unit TX1 is supplied with the low-level pulse, and thus the first charge transfer unit TX1 turns to the off-state. Compared with the state in FIG. 6A, the potential barrier is high between the photoelectric conversion unit PD and the first signal holding unit MEM1. In FIG. 6B, a small number of electrons are accumulated in the photoelectric conversion unit PD. Furthermore, in FIG. 6B, the fourth charge transfer unit TX4 is in the off-state.

Furthermore, the potential produced in the fourth charge transfer unit TX4 is higher than that in the state illustrated in FIG. 6A. Furthermore, in the state illustrated in FIG. 6B, the potential produced in the first charge transfer unit TX1 is lower than that produced in the fourth charge transfer unit TX4.

The potential state illustrated in FIG. 6C are similar to that illustrated in FIG. 6B, but there is a difference in amount of light incident on the photoelectric conversion unit PD. In a case where a greater number of electrons than a particular value are generated in the photoelectric conversion unit PD, electrons move into the first signal holding unit MEM1 over a potential generated in the first charge transfer unit TX1. That is, in the exposure period from t2 to t3, if the amount of incident light is greater than a particular value, electrons are held in the photoelectric conversion unit PD and the first signal holding unit MEM1.

Figure 6D:
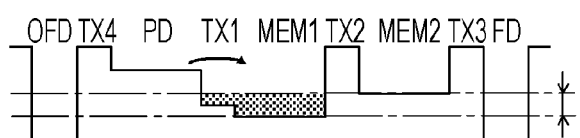

FIG. 6D illustrates a potential state in the period from t3 to t4.

The electrons accumulated in the photoelectric conversion unit PD are transferred to the first signal holding unit MEM1. To enhance the efficiency of transferring electrons from the photoelectric conversion unit PD, the potential barrier of the first charge transfer unit TX1 in the on-state may be set to be lower than the potential of the photoelectric conversion unit PD. Furthermore, the potential of the first signal holding unit MEM1 may be set to be lower than the potential of the photoelectric conversion unit PD.

In the present embodiment, the first control electrode is shared by the first charge transfer unit TX1 and the first signal holding unit MEM1. Therefore, when a turn-on pulse is supplied to the first charge transfer unit TX1, the potential of the first charge storage unit MEM1 is also lowered. However, a different configuration may be employed and control pulses may be supplied in a different manner. For example, separate control electrodes may be disposed respectively for the first charge transfer unit and the first signal holding unit and control pulses may be supplied separately to the first charge transfer unit and the first signal holding unit.

Figure 6E:
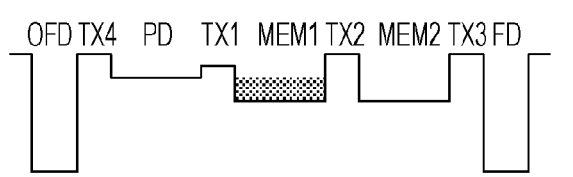

FIG. 6E illustrates a potential state in the period from t4 to t5. The first charge transfer unit TX1 has been turned into the off-state, and the second charge transfer unit TX2 is still in the off-state before being turned into the on-state. A particular number of electrons depending on the potential generated in the first charge transfer unit TX1 are accumulated in the first signal holding unit MEM1.

Figure 6F:
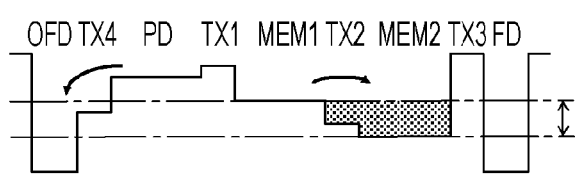

FIG. 6F illustrates a potential state in the period from t5 to t6. The electrons held in the first signal holding unit MEM1 are transferred to the second signal holding unit MEM2 via the second charge transfer unit TX2. The second control electrode of the second charge transfer unit TX2 is supplied with a high-level pulse.

In this period, to enhance the efficiency of transferring electrons from the first signal holding unit MEM1, the potential generated in the second charge transfer unit TX2 may be set to be lower than the potential of the first signal holding unit MEM1. To further enhance the efficiency, the potential of the second signal holding unit MEM2 may be set to be lower than the potential of the first signal holding unit MEM1.

In the present embodiment, the second control electrode is shared by the second charge transfer unit TX2 and second signal holding unit MEM2. Therefore, when the turn-on pulse is supplied to the first charge transfer unit TX2, the potential of the second charge storage unit MEM2 is also lowered. However, a different configuration may be employed and control pulses may be supplied in a different manner. For example, separate control electrodes may be disposed respectively for the second charge transfer unit and the second signal holding unit and control pulses may be supplied separately to the second charge transfer unit and the second signal holding unit.

Figure 6G:
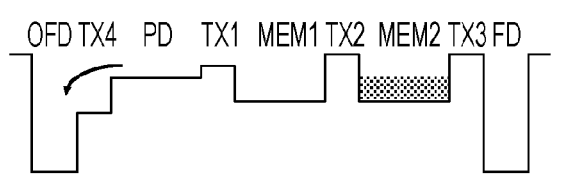

FIG. 6G illustrates a potential state of pixels in the first row in the period from t6 to t10 and a potential state of pixels in the second row in the period from t6 to t18. At the beginning of each of these periods, the second charge transfer unit TX2 turns to the off-state, and the third charge transfer unit TX3 turns on at the end of each of these periods. Note that the specific period varies depending on the pixel row.

In these periods, the second charge transfer unit TX2 and the third charge transfer unit TX3 are both in the off-state, and thus the potentials formed in these units cause electrons to be accumulated in the second signal holding unit MEM2.

Figure 6H:
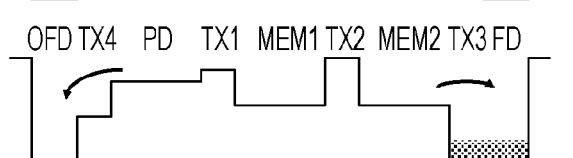

FIG. 6H illustrates a potential state of pixels in the first row in the period from t10 to t11 and a potential state of pixels in the second row in the period from t18 to t19. The third charge transfer unit TX3 turns to the on-state, and the electrons held in the second signal holding unit MEM2 are transferred to the input node FD of the amplifying element. In these periods, to enhance the efficiency of transferring electrons from the second signal holding unit MEM2, the potential formed in the third charge transfer unit TX3 may be set to be lower than the potential of the second signal holding unit MEM2. To further enhance the efficiency, the potential of the input node FD of the amplifying element may be set to be lower than the potential of the second signal holding unit MEM2.

Figure 6I:
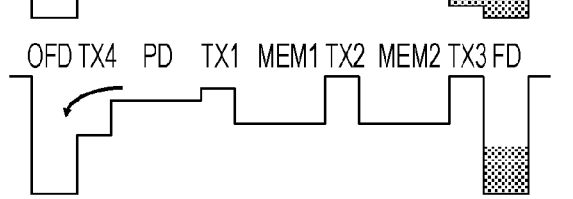

FIG. 6I illustrates a potential state of pixels in the first row in the period following t11 and a potential state of pixels in the second row in the period following t19. At the beginning of each of these periods, the third charge transfer unit TX3 turns to the off-state. Although light is incident on the photoelectric conversion unit PD, the fourth charge transfer unit TX4 ejects electrons to the OFD region. Furthermore, even when the first charge storage unit MEM1 has an intruding charge, it is possible to reduce an influence on image quality by providing the potential state illustrated in FIG. 6A when reading of a next frame is started.

In the present embodiment, as described above, the voltage V1 supplied to the first control electrode when electrons are transferred from the photoelectric conversion unit to the first signal holding unit is lower than the voltage V2 supplied to the second control electrode when electrons held in the first signal holding unit to the second signal holding unit.

By setting the voltages V1 and V2 in the above-described manner, it becomes possible to reduce the number of electrons that return to the photoelectric conversion unit from the first charge transfer unit TX1 without moving to the first signal holding unit. Simply from the viewpoint of the potentials, an equal high voltage may be supplied to both the first charge transfer unit and the second charge transfer unit to lower both the potentials of the first charge transfer unit and the second charge transfer unit in the on-state. However, supplying the equal high voltage to the first charge transfer unit and the second charge transfer unit may not necessarily result in an increase in charge transfer efficiency, because electrons in the charge transfer unit may be redistributed, and the redistribution may cause an increase in the number of electrons returning to the photoelectric conversion unit. Although it may be important to reduce the absolute number of such electrons, a difference may occur in the number of electrons returning to the photoelectric conversion unit depending on locations of pixels in the image sensing plane. This may result in a reduction in image quality in terms of shading of an image. By providing the voltages controlled in the above-described manner according to the present embodiment, it is possible to reduce the number of returning electrons.

In the present embodiment, the first control electrode is shared by the first charge transfer unit TX1, and the first signal holding unit MEM1, and the second control electrode is shared by the second charge storage unit and the second signal holding unit. Alternatively, control electrodes may be provided separately for the first charge transfer unit, the first signal holding unit, the second charge transfer unit, and the second signal holding unit. In this case, it is possible to reduce the number of retuning electrons by properly setting voltages supplied to respective control electrodes of the first charge transfer unit and the second charge transfer unit. This can be understood by making a comparison between FIG. 6D and FIG. 6F. The amount of the change in potential of TX1 which occurs when the state changes from that illustrated in FIG. 6C to that illustrated in FIG. 6D is smaller than the amount of the change in potential of TX2 which occurs when the state changes from that illustrated in FIG. 6E to that illustrated in FIG. 6F. This may be achieved by setting the high-level voltage supplied to the first control electrode to be lower than the high-level voltage supplied to the second control electrode. This makes it possible to reduce the number of electrons returning to the photoelectric conversion unit caused by the redistribution of electrons.

In the case wherein the control electrodes are provided separately for the first signal holding unit and the second signal holding unit, if V1 denotes the voltage supplied to the first control electrode when electrons are transferred from the photoelectric conversion unit to the first semiconductor region of the first signal holding unit, and V2 denotes the voltage supplied to the second control electrode when electrons held in the first semiconductor region to the second semiconductor region of the second signal holding unit, it may be advantageous that the voltages are set such that V1<V2. By setting the voltages in the above-described manner, it becomes possible to enhance the efficiency of transferring electrons to the second signal holding unit due to a mechanism in addition to the reduction in the number of returning electrons, as described below. When a high-level pulse is supplied to the first control electrode of the first signal holding unit, the potential of the N-type semiconductor region of the first signal holding unit is lowered by an effect of an electric field from the first control electrode. This also occurs in the second signal holding unit. In this situation, if V1<V2, then it is possible to easily achieve the potentials such that the potential in the second signal holding unit is lower than the potential in the first signal holding unit during the operation of transferring electrons from the first signal holding unit to the second signal holding unit. More specifically, for example, it becomes possible to easily achieve the state illustrated in FIG. 6A or the state illustrated in FIG. 6F. Thus, it becomes possible to easily increase the efficiency of transferring the charge from the first signal holding unit to the second signal holding unit.

Figure 7:
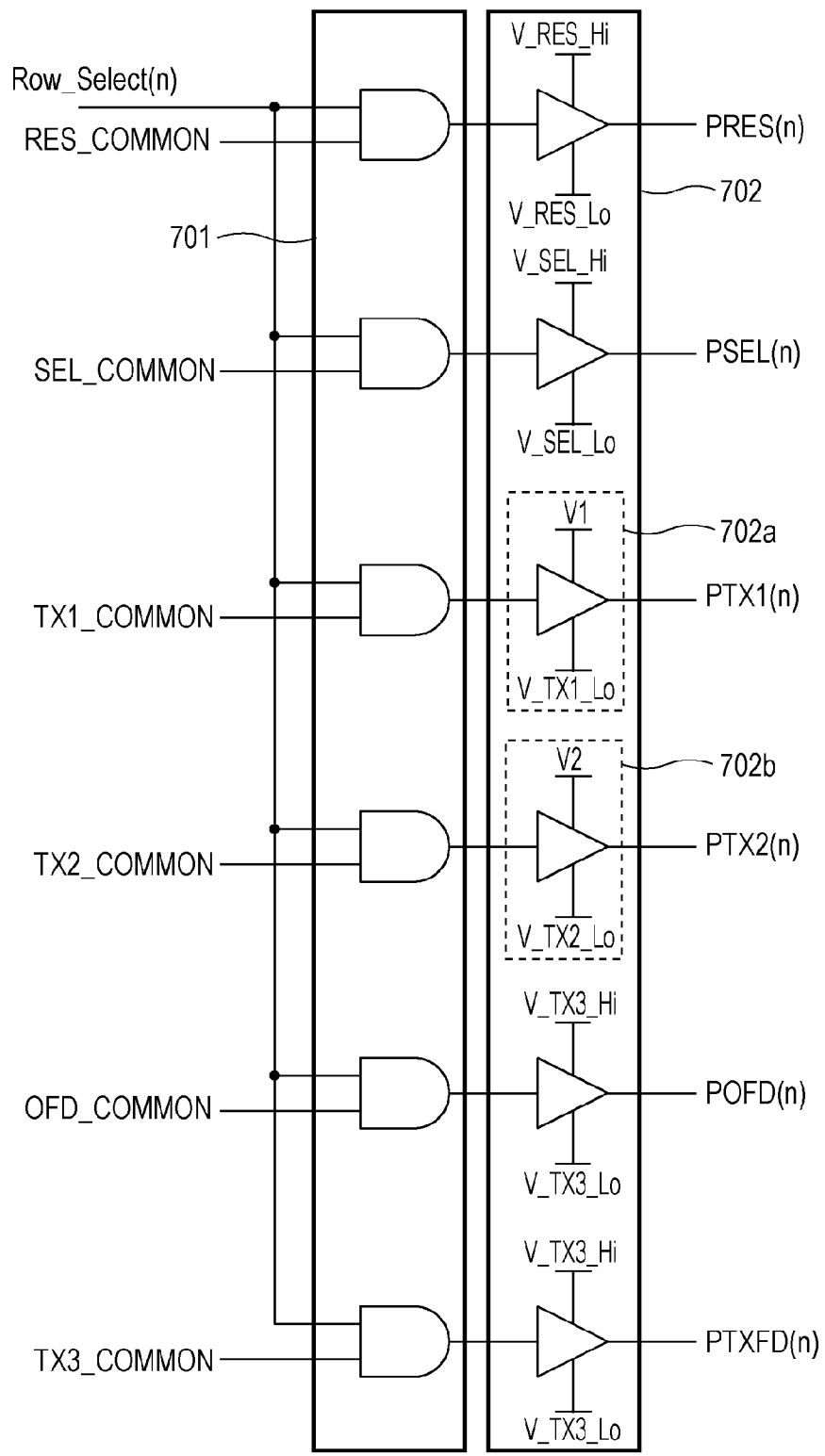
FIG. 7 is a block diagram of a vertical scanning unit of the image pickup apparatus according to the first embodiment.

FIG. 7 illustrates an example of a vertical scanning unit according to the present embodiment. Note that FIG. 7 does not illustrate all elements in the vertical scanning unit but FIG. 7 illustrates only elements that are associated with supplying control pulses to a plurality of pixels in one row. A logic circuit 701 receives a control pulse Row_Select(n) from a vertical scanning circuit (not illustrated). The control pulse Row_Select(n) is subjected to logical operations with common pulses supplied in common to all pixel rows thereby generating control pluses finally supplied to various control electrodes or transistors in the pixels. A common pulse RES_COMMON is used in generating a control pulse supplied to reset transistors. A common pulse SEL_COMMON is used in generating a control pulse supplied to selection transistors. A common pulse TX1_COMMON is used in generating a control pulse supplied to first control electrodes. A common pulse TX2_COMMON is used in generating a control pulse supplied to second control electrodes. A common pulse TX3_COMMON is used in generating a control pulse supplied to third control electrodes. A common pulse OFD_COMMON is used in generating a control pulse supplied to fourth control electrodes.

A buffer unit 702 receives pulses corresponding to the respective elements of each pixel from logic circuits in the logic circuit 701. In response to receiving the pulses, the buffer unit 702 supplies the control pluses to the respective elements after buffering. A first buffer 701*a* generates a control pulse supplied to first charge transfer units. A second buffer 701*b* generates a control pulse supplied to second charge transfer units. In the present example, each buffer is realized by an inverter. To generate pulses such that the above-described condition in terms of the voltages is satisfied, V1' is supplied as a power supply voltage to the first buffer 701*a*, and V2' is supplied as a power supply voltage to the second buffer 701*b*. V1' and V2' do not need to be exactly equal to V1 and V2 which are finally supplied to control electrodes of pixels, but V1' and V2' are set such that V1'<V2'. In the present embodiment, a low-level voltage supplied to first charge transfer units is determined based on a voltage V_TX1_Lo, and a low-level voltage supplied to second charge transfer units is determined based on a voltage V_TX2_Lo. V_TX1_Lo and V_TX2_Lo may take arbitrary values that are capable of turning off the first and second charge transfer units. However, it may be advantageous that V_TX1_Lo and V_TX2_Lo are set to negative voltages to reduce dark currents. Furthermore, V_TX1_Lo and V_TX2_Lo may be equal in value. This allows it to simplify a circuit configuration. In the case where V_TX1_Lo and V_TX2_Lo are set to be equal to each other, a difference occurs only in high level, and thus the pulse supplied to first control electrodes have a smaller amplitude than that supplied to second control electrodes.

By employing the configuration described above, it is possible to easily satisfy the above-described condition in terms of the voltages.

Second Embodiment

Figure 8:
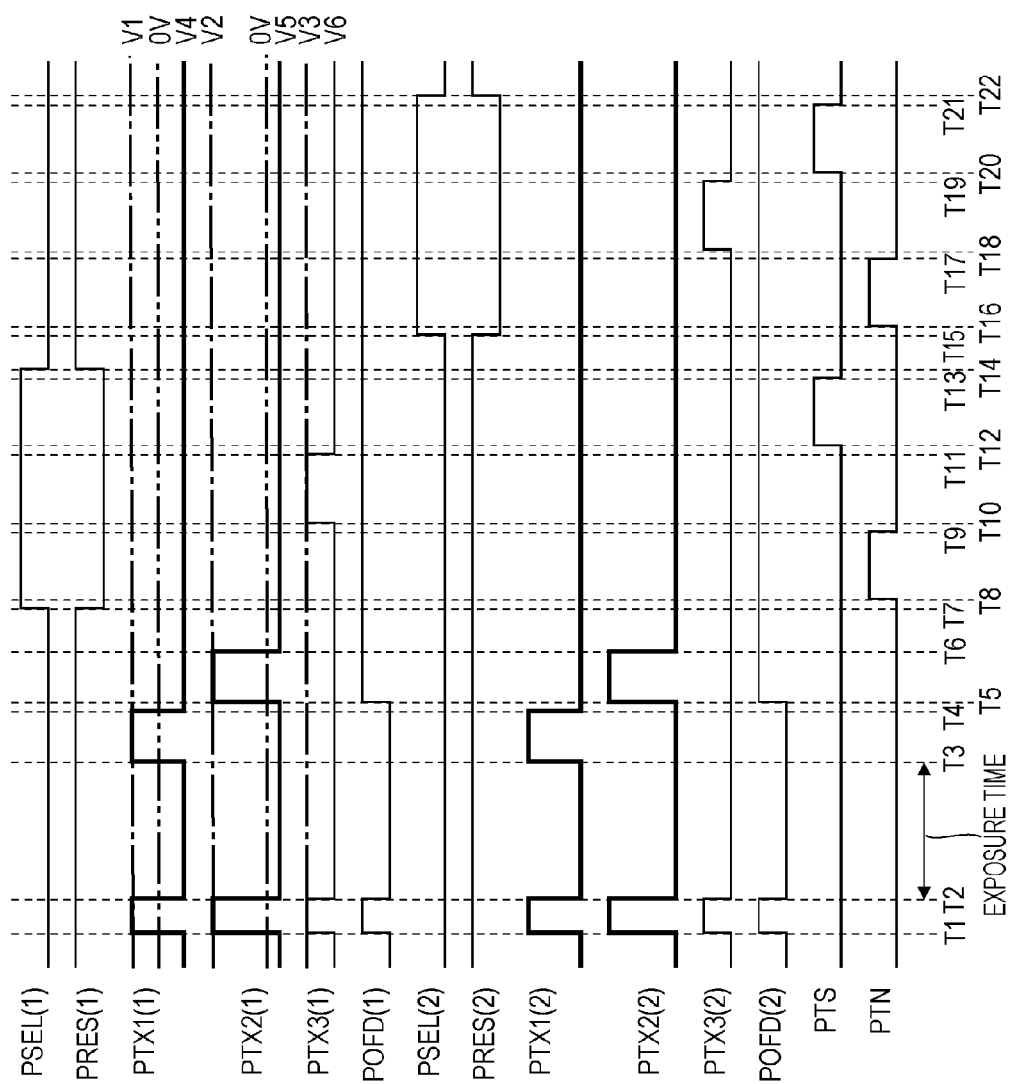
FIG. 8 is a diagram illustrating sequences of control pulses supplied to an image sensing area of an image pickup apparatus according to a second embodiment.

FIG. 8 illustrates control pluses supplied to an image sensing area of an image pickup apparatus according to a second embodiment. In FIG. 8, similar elements to those in the first embodiment are denoted by similar reference numerals. In the present embodiment, sequences of control pluses are basically similar to those according to the first embodiment except for low levels of pulses supplied to first and second control electrodes. In FIG. 8, V4 denotes a low-level voltage supplied to the first control electrode, and V5 denotes a low-level voltage supplied to the second control electrode. V4 and V5 are both negative, and V4 is greater in absolute value than V5. For example, V4 and V5 may be set such that V4=−4.0 V and V5=−3.0 V. By setting the voltages in the above-described manner, it makes it easy to design devices while suppressing dark currents. Note that also in the present embodiment, voltages V1 and V2 are set such that V1<V2 as in the first embodiment. Thus, a difference between the voltage V1 and the voltage V4 (the amplitude of the pulse supplied to the first control electrode) becomes closer to a difference between the voltage V2 and the voltage V5 (the amplitude of the pulse supplied to the second control electrode) than in the first embodiment. By employing the configuration described above, it becomes possible to employ a similar structure associated with withstand voltages for both the first charge transfer unit and the second charge transfer unit, which makes it possible to simplify device structures.

As in the first embodiment, the relative magnitude relationship between the voltages V4 and V5 may be applied to the control electrodes of the first signal holding unit and the second signal holding unit to achieve a similar effect.

Application to Image Pickup System

Figure 9:
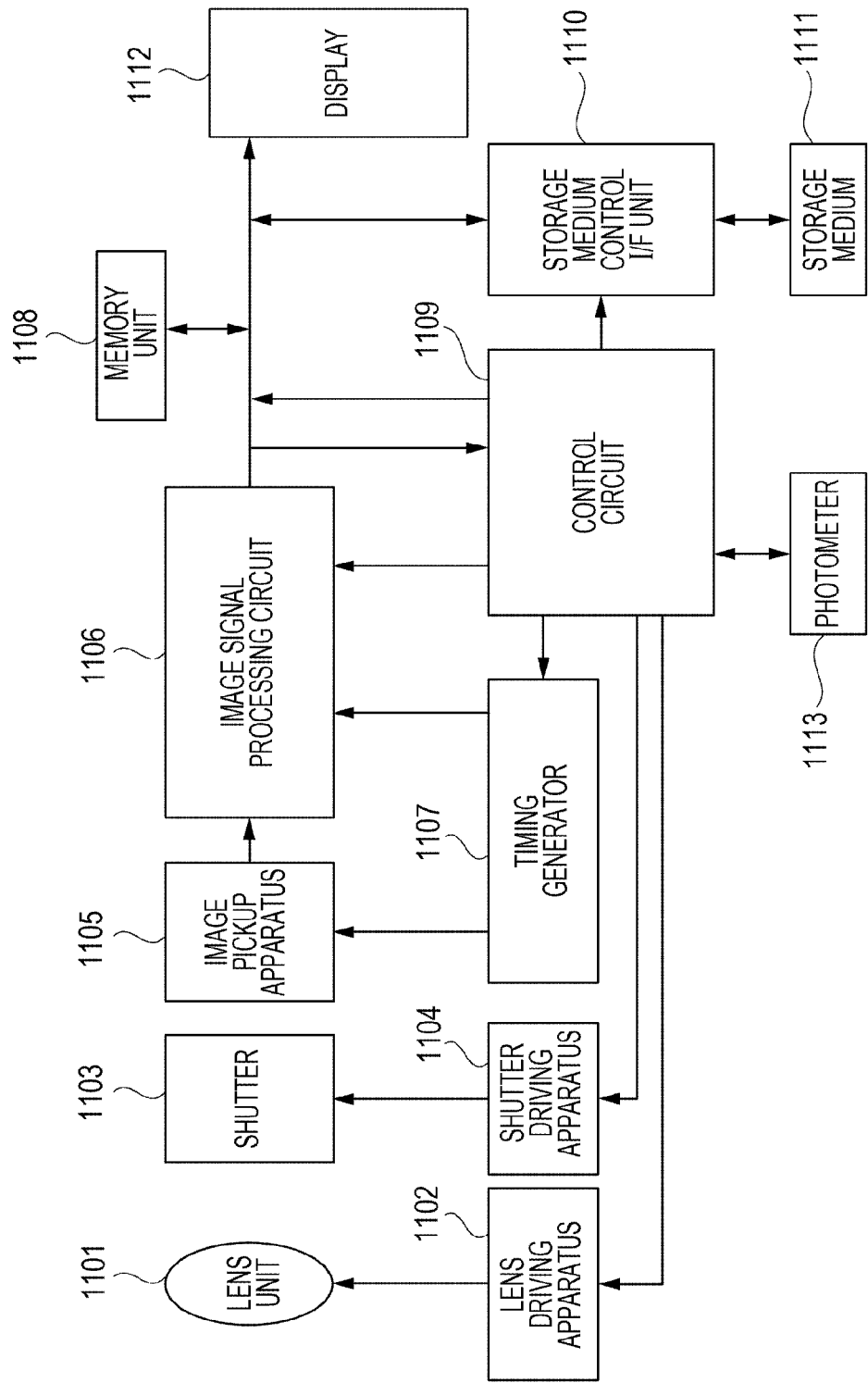
FIG. 9 is a diagram illustrating an image pickup system using an image pickup apparatus.

FIG. 9 illustrates an example of an image pickup system using an image pickup apparatus according to one of embodiments.

In FIG. 9, reference numeral 1101 denotes a lens unit configured to form an optical image of an object on an image pickup apparatus 1105. The lens unit 1101 is driven by a lens driving apparatus 1102 to perform an operation such as zooming, focusing, controlling an aperture, or the like. Reference numeral 1103 denotes a mechanical shutter that is controlled by a shutter control unit 1104. Note that when a global electronic shutter is available in the image pickup system, the mechanical shutter may not be necessary. However, both the global electronic shutter and the mechanical shutter may be provided in the image pickup system such that the global electronic shutter and the mechanical shutter are switchable depending on a mode. Reference numeral 1105 denotes an image pickup apparatus configured to capture an image signal of the image the object formed via the lens unit 1101. Reference numeral 1106 denotes an image signal processing circuit configured to perform processing, such as various kinds of correction, compression, etc., on the image signal output from the image pickup apparatus 1105. Reference numeral 1107 denotes a timing generator configured to output various timing signals to the image pickup apparatus 1105 and the image signal processing circuit 1106 thereby driving the image pickup apparatus 1105 and the image signal processing circuit 1106. Reference numeral 1109 denotes a control circuit that performs various operations and controls the whole image pickup apparatus. Reference numeral 1108 denotes a memory unit configured to temporarily store image data. Reference numeral 1110 denotes a storage medium control I/F (interface) unit serving as an interface in an operation storing or reading image data in or from a storage medium. Reference numeral 1111 denotes a removable storage medium such as a semiconductor memory in or from which image data is stored or read out. Reference numeral 1112 denotes a display that displays various kinds of information or a captured image.

Next, a description is given below as to an image-taking operation performed by a digital camera configured in the above-described manner.

When a main power supply is turned on, a power supply for a control system is turned on and furthermore, a power supply for image capturing circuits including the image signal processing circuit 1106 is turned on.

Thereafter, if a release button (not illustrated) is pushed, a ranging operation is performed based on data supplied from the image pickup apparatus 1105, and the distance to an object is calculated based on a result of the ranging operation by the control circuit 1109. Thereafter, the lens driving apparatus 1102 drives the lens unit to determine whether an in-focus condition is achieved. If it is determined that an in-focus condition is not achieved, the ranging operation is performed again by driving the lens unit. Instead of performing the ranging operation based on data supplied from the image sensor, the ranging operation may be performed using a dedicated ranging apparatus (not illustrated).

After an in-focus condition is achieved, an image capturing operation is started. After the image capturing operation is complete, an image signal output from the image pickup apparatus 1105 is subjected to image processing performed by the image signal processing circuit 1106, and a resultant image signal is written in the memory under the control of the control circuit 1109. More specifically, the image signal processing circuit 1106 may perform a sorting operation, an addition operation, a selection operation, etc. The data stored in the memory 1108 is, under the control of the control circuit 1109, transferred via the storage medium control I/F unit 1110 and stored in the removal storage medium 1111 such as a semiconductor memory.

Alternatively, the image data may be directly input to a computer or the like via an external device I/F unit (not illustrated) and the image data may be processed in the computer.

The invention has been described above with reference to specific embodiments. Note that modifications are possible without departing from the scope of the invention.

For example, in the embodiments described above, the signal charges are provided by electrons. Alternatively, the signal charges may be provided by holes. In this case, the high-level voltage supplied to the first control electrode may be set to be higher than the high-level voltage supplied to the second control electrode. This makes it possible to easily form proper potential states such as those illustrated in FIGS. 6A to 6I.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-033365 filed Feb. 17, 2012, which is hereby incorporated by reference herein in its entirety.

What is claimed is:

1. An image pickup apparatus comprising a plurality of pixels each including
    a photoelectric conversion unit,
    an amplifying element configured to amplify a signal based on electrons generated in the photoelectric conversion unit,
    a first signal holding unit and a second signal holding unit located at a stage following the first signal holding unit, both being disposed in an electric path between the photoelectric conversion unit and an input node of the amplifying element,
    a first charge transfer unit configured to transfer electrons from the photoelectric conversion unit to the first signal holding unit, and
    a second charge transfer unit configured to transfer electrons held by the first signal holding unit to the second signal holding unit,
    the first charge transfer unit including a first semiconductor region and a first control electrode disposed above the first semiconductor region via an insulating film,
    the second charge transfer unit including a second semiconductor region and a second control electrode disposed above the second semiconductor region via an insulating film,
    the first control electrode and the second control electrode being supplied with voltages such that a voltage supplied to the first control electrode when the electrons are transferred from the photoelectric conversion unit to the first signal holding unit is lower than a voltage supplied to the second control electrode when the electrons held by the first signal holding unit are transferred to the second signal holding unit.

2. The image pickup apparatus according to claim 1, wherein
    the first signal holding unit includes a third semiconductor region of an N type and the first control electrode disposed above the third semiconductor region via an insulating film, and
    the second signal holding unit includes a fourth semiconductor region of an N type and the second control electrode disposed above the fourth semiconductor region via an insulating film.

3. The image pickup apparatus according to claim 1, wherein during a period in which electrons are held by the first signal holding unit, a height of a potential barrier formed in the first charge transfer unit against electrons is lower than a height of a potential barrier formed in the second charge transfer unit against electrons.

4. An image pickup apparatus comprising a plurality of pixels each including
    a photoelectric conversion unit,
    an amplifying element configured to amplify a signal based on electrons generated in the photoelectric conversion unit, and
    a first signal holding unit and a second signal holding unit located at a stage following the first signal holding unit, both being disposed in an electric path between the photoelectric conversion unit and an input node of the amplifying element, the first signal holding unit including a first semiconductor region of an N type and the first control electrode disposed above the first semiconductor region via an insulating film, the second signal holding unit including a second semiconductor region of an N type and the second control electrode disposed above the second semiconductor region via an insulating film, the first control electrode and the second control electrode being supplied with voltages such that a voltage supplied to the first control electrode when the electrons are transferred from the photoelectric conversion unit to the first semiconductor region is lower than a voltage supplied to the second control electrode when the electrons held by the first semiconductor region are transferred to the second semiconductor region.

5. An image pickup apparatus comprising a plurality of pixels each including a photoelectric conversion unit, an amplifying element configured to amplify a signal based on holes generated in the photoelectric conversion unit, and a first signal holding unit and a second signal holding unit located at a stage following the first signal holding unit, both being disposed in an electric path between the photoelectric conversion unit and an input node of the amplifying element, the first charge transfer unit including a first semiconductor region and a first control electrode disposed above the first semiconductor region via an insulating film, the second charge transfer unit including a second semiconductor region and a second control electrode disposed above the second semiconductor region via an insulating film, the first control electrode and the second control electrode being supplied with voltages such that a voltage supplied to the first control electrode when the holes are transferred from the photoelectric conversion unit to the first signal holding unit is higher than a voltage supplied to the second control electrode when the electrons held by the first signal holding unit are transferred to the second signal holding unit.

6. An image pickup apparatus comprising a plurality of pixels each including a photoelectric conversion unit, an amplifying element configured to amplify a signal based on holes generated in the photoelectric conversion unit, and a first signal holding unit and a second signal holding unit located at a stage following the first signal holding unit, both being disposed in an electric path between the photoelectric conversion unit and an input node of the amplifying element, the first signal holding unit including a first semiconductor region of a P type and a first control electrode disposed above the first semiconductor region via an insulating film, the second signal holding unit including a second semiconductor region of P type and a second control electrode disposed above the second semiconductor region via an insulating film, the first control electrode and the second control electrode being supplied with voltages such that a voltage supplied to the first control electrode when the holes generated in the photoelectric conversion unit are transferred to the first semiconductor region is higher than a voltage supplied to the second control electrode when holes held by the first semiconductor region are transferred to the second semiconductor region.

7. A method of driving an image pickup apparatus including a plurality of pixels in each of which a first charge transfer unit, a first signal holding unit, a second charge transfer unit, and a second signal holding unit are disposed in the order described above in an electric path between an output node of a photoelectric conversion unit and an input node of an amplifying element configured to amplify a signal based on electrons generated in the photoelectric conversion unit, the method comprising:

supplying a first voltage to a first control electrode possessed by the first charge transfer unit when the electrons generated in the photoelectric conversion unit are transferred to the first signal holding unit; and supplying a second voltage to a second control electrode possessed by the second charge transfer unit when the electrons held by the first signal holding unit are transferred to the second signal holding unit, the first and second voltage being set such that the first voltage is lower than the second voltage.

8. A method of driving an image pickup apparatus including a plurality of pixels in each of which a first signal holding unit and a second signal holding unit are disposed in an electric path between an output node of a photoelectric conversion unit and an input node of an amplifying element configured to amplify a signal based on electrons generated in the photoelectric conversion unit, the second signal holding unit being located at a stage following the first signal holding unit, the method comprising:

supplying a first voltage to a first control electrode possessed by the first signal holding unit when electrons generated in the photoelectric conversion unit are transferred to the first signal holding unit; and supplying a second voltage to a second control electrode possessed by the second charge transfer unit when electrons held by the first signal holding unit are transferred to the second signal holding unit, the first and second voltage being set such that the first voltage is lower than the second voltage.

9. A method of driving an image pickup apparatus including a plurality of pixels in each of which a first charge transfer unit, a first signal holding unit, a second charge transfer unit, and a second signal holding unit are disposed in the order described above in an electric path between an output node of a photoelectric conversion unit and an input node of an amplifying element configured to amplify a signal based on holes generated in the photoelectric conversion unit, the method comprising:

supplying a first voltage to a first control electrode possessed by the first charge transfer unit when the holes generated in the photoelectric conversion unit are transferred to the first signal holding unit; and supplying a second voltage to a second control electrode possessed by the second charge transfer unit when holes held by the first signal holding unit are transferred to the second signal holding unit, the first and second voltage being set such that the first voltage is higher than the second voltage.

10. A method of driving an image pickup apparatus including a plurality of pixels in each of which a first signal holding unit and a second signal holding unit are disposed in an electric path between an output node of a photoelectric conversion unit and an input node of an amplifying element configured to amplify a signal based on holes generated in the photoelectric conversion unit, the second signal holding unit being located at a stage following the first signal holding unit, the method comprising:

supplying a first voltage to a first control electrode possessed by the first signal holding unit when the holes generated in the photoelectric conversion unit are transferred to the first signal holding unit; and supplying a second voltage to a second control electrode possessed by the second charge transfer unit when the holes held by the first signal holding unit are transferred to the second signal holding unit, the first and second voltage being set such that the first voltage is higher than the second voltage.

* * * * *